United States Patent
Hirota et al.

(10) Patent No.: US 7,770,967 B2
(45) Date of Patent: Aug. 10, 2010

(54) HEAD REST DEVICE

(75) Inventors: Koichi Hirota, Takahama (JP); Koji Ito, Yatomi (JP); Motomi Iyoda, Seto (JP); Tatsuhiro Okawa, Toyota (JP); Fumitoshi Akaike, Nisshin (JP); Seiya Nishimura, Okazaki (JP)

(73) Assignees: Aisin Seiki Kabushiki Kaisha, Kariya-shi (JP); Toyota Jidosha Kabushiki Kaisha, Toyota-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 110 days.

(21) Appl. No.: 12/093,731

(22) PCT Filed: Nov. 15, 2006

(86) PCT No.: PCT/JP2006/322764

§ 371 (c)(1),
(2), (4) Date: May 15, 2008

(87) PCT Pub. No.: WO2007/058214

PCT Pub. Date: May 24, 2007

(65) Prior Publication Data

US 2009/0160235 A1    Jun. 25, 2009

(30) Foreign Application Priority Data

Nov. 17, 2005    (JP) .............................. 2005-333258

(51) Int. Cl.
*A47C 7/38*    (2006.01)
*B60N 2/42*    (2006.01)
*B60N 2/48*    (2006.01)
*B60R 21/015*    (2006.01)

(52) U.S. Cl. ................................. 297/216.12; 297/391

(58) Field of Classification Search ............ 297/216.12, 297/391, 408, 409; 701/49
See application file for complete search history.

(56) References Cited

U.S. PATENT DOCUMENTS 4,933,618 A * 6/1990 Ortlieb ........................ 318/640

(Continued)

FOREIGN PATENT DOCUMENTS

JP    7 67744    3/1995
JP    8-72660    3/1996

(Continued)

OTHER PUBLICATIONS

U.S. Appl. No. 12/097,052, filed Jun. 12, 2008, Hirota, et al.

*Primary Examiner*—David Dunn
*Assistant Examiner*—Tania Abraham
(74) *Attorney, Agent, or Firm*—Oblon, Spivak, McClelland, Maier & Neustadt, L.L.P.

(57) ABSTRACT

A head rest device that improves reliability of detecting a head on the basis of a change in capacitance without complicating a wiring structure. A head rest device is provided with a head rest rear portion configured to be supported to a seat back, and a head rest front portion freely moving forward and backward between a fully-closed position coming close to the head rest rear portion and a fully-open position separated from the head rest rear portion. The head rest front portion is moved by an actuator. The head rest front portion has a sensor electrode structured such that its capacitance is changed as a head of an occupant approaches, and an ECU controlling the actuator so as to move the head rest front portion and detecting the approach of the head of the occupant on the basis of a change of the capacitance of the sensor electrode thereon.

8 Claims, 5 Drawing Sheets

U.S. PATENT DOCUMENTS

| | | | |
|---|---|---|---|
| 4,944,554 A * | 7/1990 | Gross et al. | 297/284.3 |
| 5,694,320 A | 12/1997 | Breed | |
| 6,213,548 B1 * | 4/2001 | Van Wynsberghe et al. | 297/216.12 |
| 6,402,195 B1 * | 6/2002 | Eisenmann et al. | 280/735 |
| 7,073,856 B2 * | 7/2006 | Akaike et al. | 297/216.12 |
| 7,111,901 B2 * | 9/2006 | Schlierf et al. | 297/216.12 |
| 7,284,793 B2 * | 10/2007 | Kluhspies et al. | 297/216.12 |
| 2001/0040396 A1 | 11/2001 | Kreuels et al. | |
| 2003/0015898 A1 * | 1/2003 | Breed | 297/216.12 |
| 2005/0077762 A1 * | 4/2005 | Kraemer et al. | 297/216.12 |
| 2007/0027599 A1 | 2/2007 | Sakai et al. | |

FOREIGN PATENT DOCUMENTS

| | | |
|---|---|---|
| JP | 8 187139 | 7/1996 |
| JP | 9 226428 | 9/1997 |
| JP | 2000 309242 | 11/2000 |
| JP | 2004 9891 | 1/2004 |
| JP | 2005 13604 | 1/2005 |
| JP | 2005 87650 | 4/2005 |
| WO | WO 01/56829 A1 | 8/2001 |
| WO | 2005 073019 | 8/2005 |

* cited by examiner

Fig.4
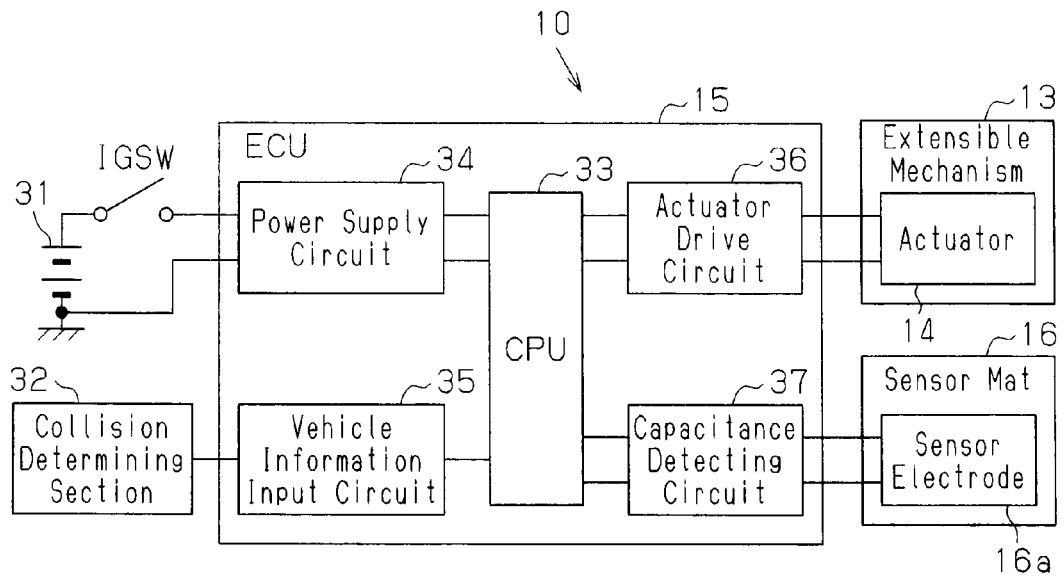
Fig.5(a)    Fig.5(b)
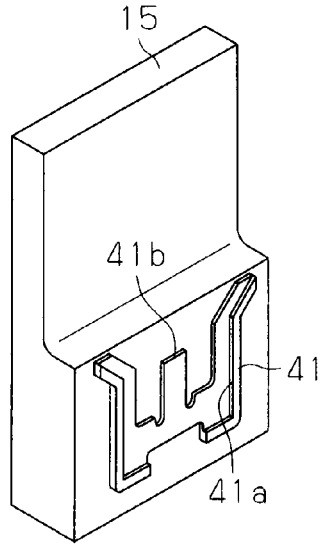
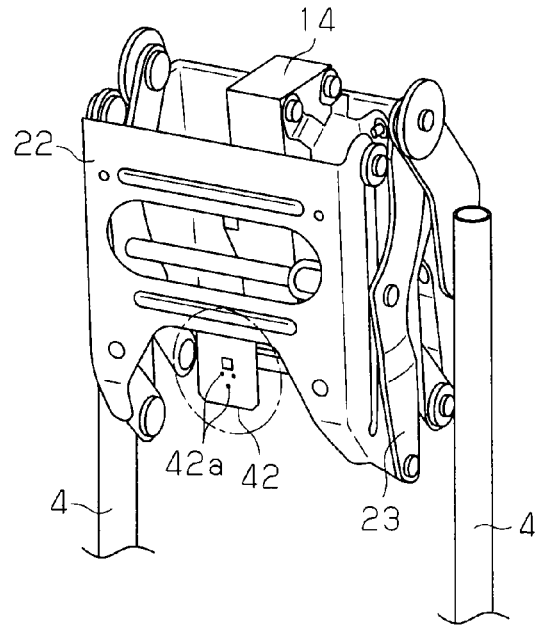

HEAD REST DEVICE

FIELD OF THE INVENTION

The present invention relates to a head rest device provided in a vehicle seat of an automobile or the like.

BACKGROUND OF THE INVENTION

If an impact is applied to a vehicle from a rear side in a state in which an occupant of the vehicle is not leaning against an upper body on a seat back, a head of the occupant rapidly moves to a head rest in accordance with a rapid movement of the upper body of the occupant to the seat back. At this time, a difference is generated between a moving amount of the upper body and a moving amount of the head of the occupant, and the head of the occupant moves rearward more largely than the upper body. Thereafter, the upper body of the occupant is largely oscillated forward on the basis of a reaction of the impact force. However, a load is applied to a neck region of the occupant on the basis of the difference of the moving amounts at this time.

Thus, conventionally, for example, as disclosed in Patent Documents 1 and 2, there has been proposed a head rest device provided with a mechanism of moving the head rest forward to the head of the occupant at a time when an impact is applied to the vehicle from the rear side. On the basis of the structure described above, the head of the occupant is prevented from moving backward largely at a time when the shock is applied from the rear side, and the load applied to the neck region of the occupant is reduced.

Patent Document 1: Japanese Laid-Open Patent Publication No. 2005-13604

Patent Document 2: Japanese Laid-Open Patent Publication No. 2005-87650

SUMMARY

In the conventional head rest device, in order to suitably stop the head rest at a position corresponding to the head of the occupant at a time of moving the head rest toward the front side of the vehicle, a method may be employed in which a sensor electrode is provided in the head rest to detect an approach of the head of the occupant on the basis of a change of a capacitance detected by the sensor electrode.

However, in this case, a parasitic capacity of a wiring itself may be generated between the sensor electrode and a circuit detecting the capacitance of the sensor electrode. Also, a parasitic capacity may be generated between the wiring and a peripheral conductive material, and a parasitic capacity may be generated by a long parallel provision of the wiring and the other wiring, and the like.

If the structure of the wiring itself is electromagnetically shielded, for example, a coaxial cable or the like, it is possible to reduce the parasitic capacity generated in the wiring, and it is possible to stably perform detection. However, since such a wiring lacks a mechanical strength, and a wire arranging characteristic is lowered by an enlargement of a diameter of the wiring, an arrangement of the parts is limited.

Accordingly, it is an objective of the present invention is to provide a head rest device which improves the reliability of detection of a head on the basis of a change in a capacitance without complicating a wiring structure.

In order to achieve the foregoing objective, in accordance with a first aspect of the present invention, a head rest device is provided that includes: a head rest rear portion configured to be supported to a seat back; a head rest front portion freely moving forward and backward between a fully-closed position coming close to the head rest rear portion and a fully-open position separated from the head rest rear portion; a driving device moving the head rest front portion; a control circuit controlling the driving device so as to move the head rest front portion; a sensor electrode structured such that a capacitance is changed as a head of an occupant approaches the sensor electrode; and a capacitance detecting circuit detecting the approach of the head of the occupant on the basis of a change in the capacitance of the sensor electrode. The sensor electrode is mounted to the head rest front portion, and the driving device, the control circuit, and the capacitance detecting circuit are mounted together to one of the head rest front portion or the head rest rear portion.

In accordance with the structure described above, since the driving device, the control circuit, the sensor electrode, and the capacitance detecting circuit are mounted to the head rest rear portion or the head rest front portion, it is possible to shorten the wiring between the driving device and the control circuit, and the wiring between the sensor electrode and the capacitance detecting circuit, in comparison with the case that both circuits are arranged outside the head rest device. Accordingly, it is possible to suppress a voltage drop between the members, and it is possible to suppress a parasitic capacity generated by the wirings that are provided long in parallel. Further, since it is possible to shorten the wiring between the sensor electrode and the capacitance detecting circuit, it is possible to suppress a parasitic capacity generated in the wiring itself, and a parasitic capacity generated between the wiring and the peripheral conductive material. Accordingly, it is possible to stably detect the capacitance changed on the basis of the approach of the head without complicating the wiring structure, and it is possible to improve the reliability of head detection.

The capacitance detecting circuit may be mounted to the head rest front portion.

The control circuit may be mounted to the head rest front portion.

In accordance with a second aspect of the present invention, a head rest device is provided that includes: a head rest rear portion supported to a seat back; a head rest front portion freely moving forward and backward between a fully-closed position coming close to the head rest rear portion and a fully-open position separated from the head rest rear portion; a driving device moving the head rest front portion; a control circuit controlling the driving device so as to move the head rest front portion; a sensor electrode structured such that a capacitance is changed as a head of an occupant approaches the sensor electrode; and a capacitance detecting circuit detecting the approach of the head of the occupant on the basis of a change in the capacitance of the sensor electrode. The head rest device is characterized in that the sensor electrode and the capacitance detecting circuit are mounted to the head rest front portion. In this case, it is possible to obtain the same operations and effects as those of the head rest device in accordance with the first aspect.

It is preferable that the sensor electrode be provided on a sensor mat, and that a cable extend from a lower portion of the sensor mat.

It is preferable that the sensor mat be arranged between a cushion retention member having a recess for accommodating a cushion, and the cushion accommodated in the recess.

It is preferable that each of the cushion retention member and a base member supporting the cushion retention member have an insertion hole, and the cable be connected to the control circuit via the insertion hole.

It is preferable that an extensible mechanism moving the head rest front portion be provided between the head rest front portion and the head rest rear portion, and the driving device be provided in the extensible mechanism.

It is preferable that the capacitance detecting circuit be fixed to a front portion of the extensible mechanism.

BRIEF DESCRIPTION OF THE DRAWINGS

FIG. 4 is a block diagram showing an electric circuit of the head rest device;

FIG. 5(a) is a perspective view of an ECU;

FIG. 5(b) is a perspective view of a head rest front portion side support member.

DETAILED DESCRIPTION OF THE PREFERRED EMBODIMENTS

Figure 1:
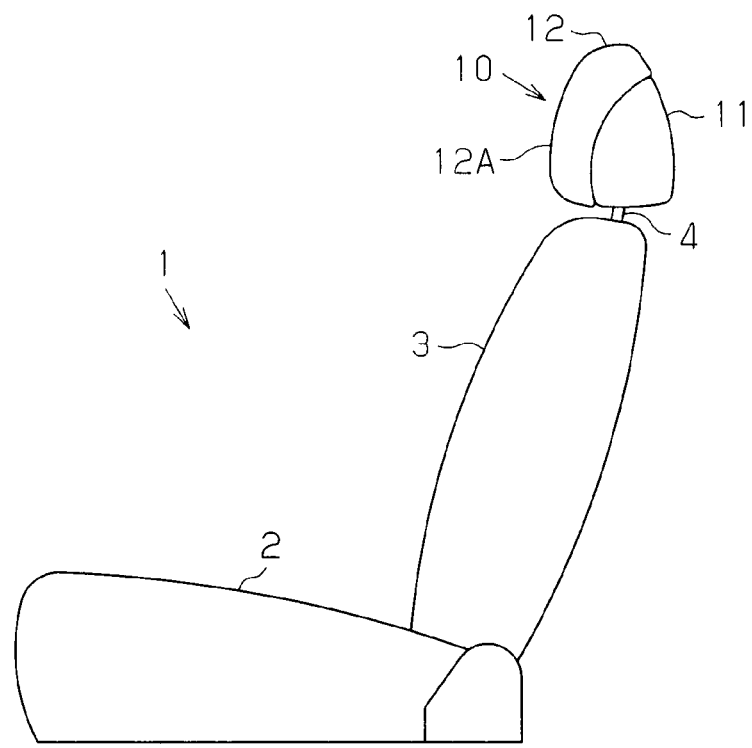
FIGS. 1(a) and 1(b) are side elevational views of a vehicle seat.
Figure 1:
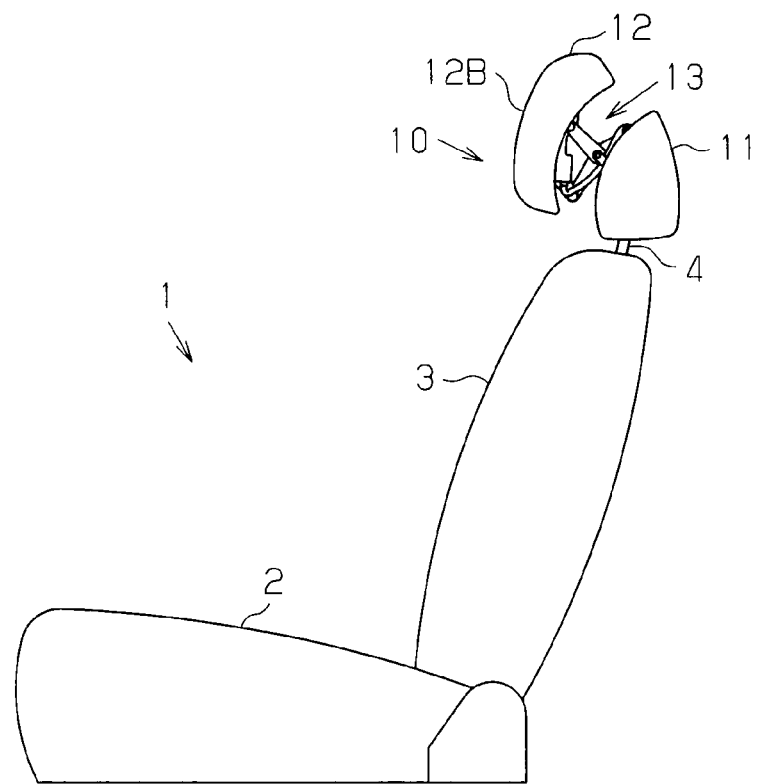

A description will be given below of an embodiment obtained by embodying the present invention with reference to the accompanying drawings.

As shown in FIGS. 1(a) and 1(b), a vehicle seat 1, which is a front passenger seat of a vehicle such as an automobile is provided with a seat 2, a seat back 3 supported to the seat 2 so as to be tiltable, and a head rest device 10 provided in an upper end portion of the seat back 3.

The head rest device 10 is provided with a head rest rear portion 11 configured to be supported to a head rest stay 4 provided in an upper end portion of the seat back 3, and a head rest front portion 12 which is movable with respect to the head rest rear portion 11. Further, the head rest rear portion 11 and the head rest front portion 12 are coupled by an extensible mechanism 13. The head rest front portion 12 is movable forward and backward between a fully-closed position 12A coming close to the head rest rear portion 11 as shown in FIG. 1(a), and a fully-open position 12B separated from the head rest rear portion 11 as shown in FIG. 1(b). The head rest front portion 12 is arranged in a fully-closed position 12A at a time of driving the vehicle, and is moved to the fully-open position 12B at a time when an impact is applied to the vehicle from the rear side.

Figure 2:
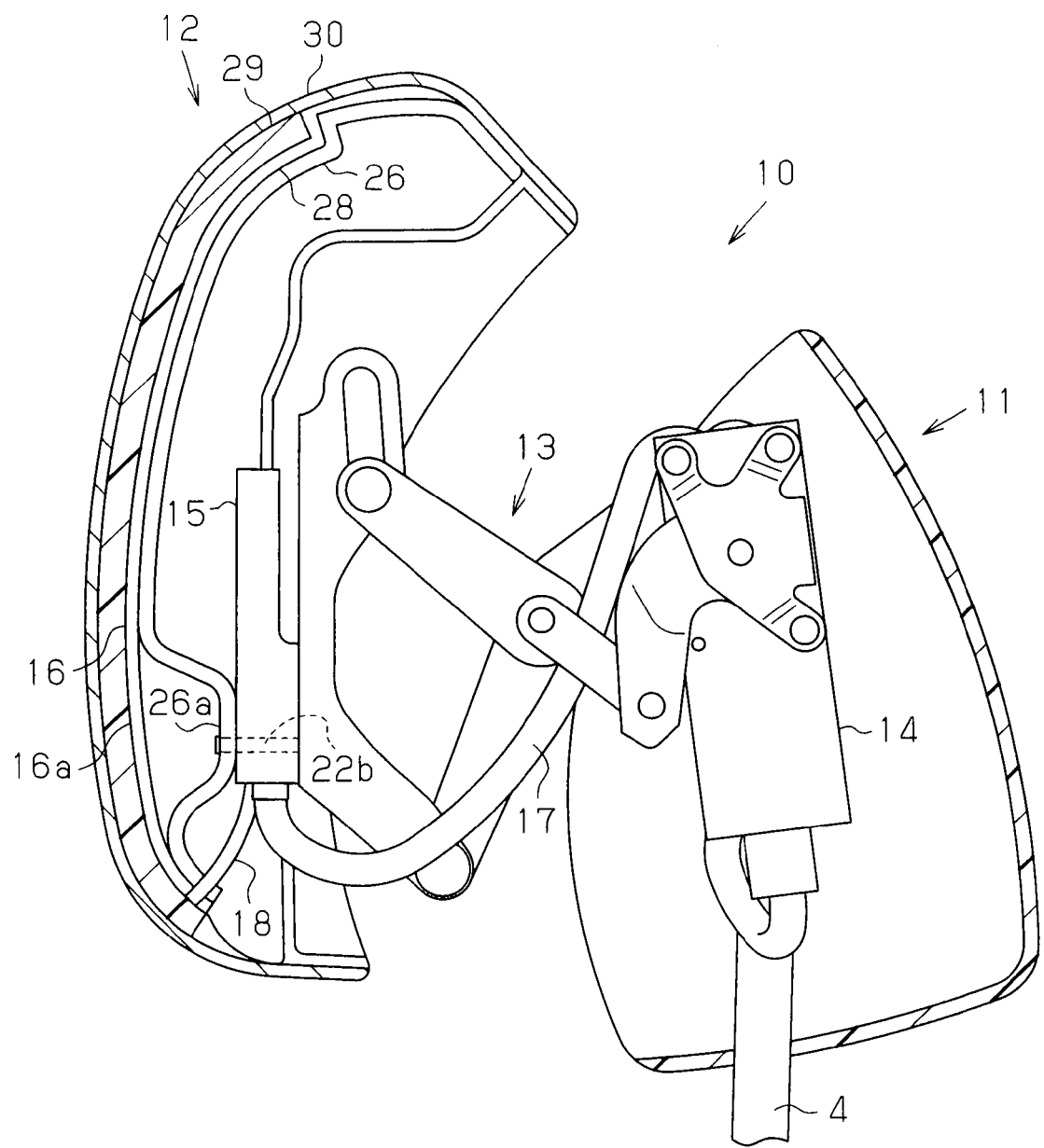
FIG. 2 is a cross-sectional view of a head rest device.

As shown in FIG. 2, the head rest device 10 is provided with an actuator 14 serving as a driving device moving the head rest front portion 12, an electronic control unit (ECU) 15, and a sensor mat 16. The sensor mat 16 is provided with a sensor electrode 16a structured such that an capacitance is changed in accordance with an approach of a head of the occupant. The ECU 15 serves as a control circuit controlling the actuator 14 so as to move the head rest front portion 12, and a capacitance detecting circuit detecting the approach of the head of the occupant on the basis of a change in the capacitance of the sensor electrode 16a.

In the present embodiment, the actuator 14 is mounted to the head rest rear portion 11, and the ECU 15 and the sensor mat 16 are mounted to the head rest front portion 12. Further, the actuator 14 and the ECU 15 are connected to each other by a harness 17. The sensor electrode 16a of the sensor mat 16 and the ECU 15 are connected to each other by a cable 18 integrally provided in the sensor electrode 16a through screen printing and a connector 19.

Figure 3:
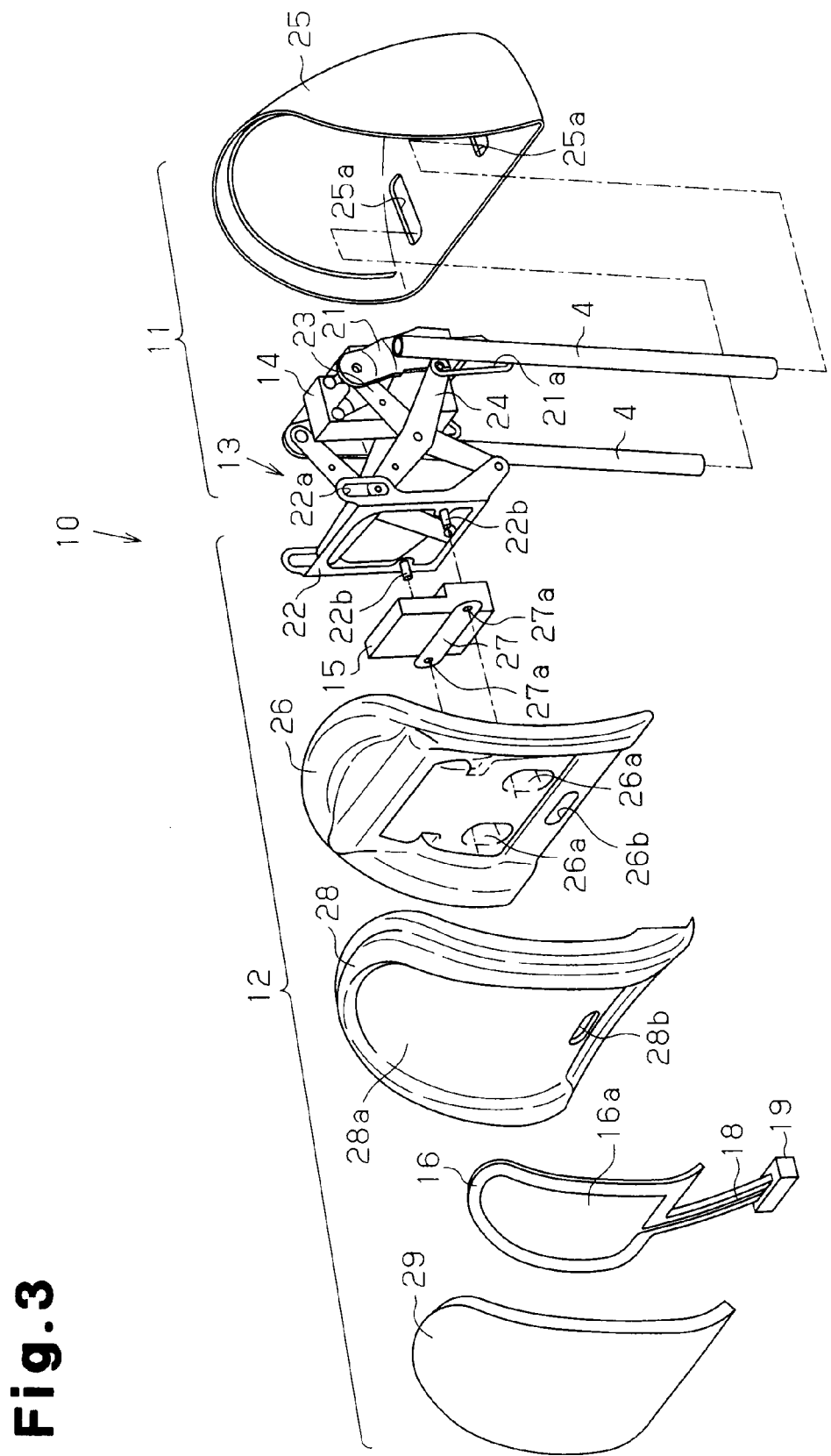
FIG. 3 is an exploded perspective view of the head rest device.

As shown in FIG. 3, the extensible mechanism 13 is provided with a rear side support member 21 positioned in a rear portion of the head rest, a front side support member 22 positioned in a front portion of the head rest, and a rotary arm 23 and an interlocking arm 24 coupling the rear side support member 21 and the front side support member 22. The rear side support member 21 is fixed to the head rest stay 4. The rotary arm 23 and the interlocking arm 24 are extended and contracted on the basis of the rear side support member 21, and the front side support member 22 is fixed to distal end portions of the rotary arm 23 and the interlocking arm 24.

The rotary arm 23 and the interlocking arm 24 are coupled to each other in their center portions so as to form an X shape. Further, both end portions of the rotary arm 23 are rotatably coupled respectively to the rear side support member 21 and the front side support member 22, and the rotary arm 23 is structured such as to be rotated by the actuator 14. Further, the interlocking arm 24 is engaged with long holes 21a and 22a respectively formed in the rear side support member 21 and the front side support member 22, and can be moved in a vertical direction. The actuator 14 and the rear side support member 21 constructing the head rest rear portion 11 are accommodated within a resin cover 25, and the head rest stay 4 to which the rear side support member 21 is fixed passes through a through hole 25a formed in a lower portion of the cover 25.

In the structure described above, when the rotary arm 23 is rotated by the actuator 14 on the basis of a rear end portion of the rotary arm 23, both end portions of the interlocking arm 24 respectively move within the long holes 21a and 22a, whereby the extensible mechanism 13 is freely extended and contracted. In accordance with the extension and contraction of the extensible mechanism 13, the head rest front portion 12 is moved between the fully-closed position 12A (refer to FIG. 1(a)) coming close to the head rest rear portion 11, and the fully-open position 12B (refer to FIG. 1(b)) separated from the head rest rear portion 11.

Further, the ECU 15, a base member 26, a cushion retention member 28, and a cushion 29 which construct the head rest front portion 12 are sequentially fixed to the front side support member 22, and are covered with a cover 30 shown in FIG. 2. Insertion holes 26b and 28b for inserting the cable 18 thereto are respectively formed in a lower portion of the base member 26 and a lower portion of the cushion retention member 28.

The ECU 15 is fixed to the front side support member 22. In detail, as shown in FIGS. 2 and 3, a pair of joint pins 22b are provided in a front surface of the front side support member 22, and a joint portion 26a of the base member 26 is fixed to the joint pins 22b. Further, a fixing bracket 27 is fixed to the front surface of the ECU 15, and a through hole 27a through which the joint pin 22b passes is formed in the fixing bracket 27. Accordingly, since the joint pin 22b is fixed to the base member 26 in a state in which the joint pin 22b passes through the through hole 27a of the fixing bracket 27, the ECU 15 is fixed between the front side support member 22 and the base member 26.

A cushion retention member (a urethane pad) 28 formed of urethane covers the base member 26, and a cushion 29 formed by a slab urethane or the like is accommodated in an accommodation recess 28a formed in the cushion retention member 28. Since the cushion 29 is fixed to the cushion retention member 28 in a state in which the sensor mat 16 is fixed to a back surface of the cushion 29 through adhesion or the like, the sensor mat 16 is fixed between the cushion 29 and the cushion retention member 28. The sensor electrode 16a is arranged over a whole surface of the sensor mat 16, the cable 18 connected to the sensor electrode 16a extends from the lower portion of the sensor mat 16, and the connector 19 electrically connected to the ECU 15 is provided in an end portion.

An insertion hole 28b for inserting the cable 18 thereto is formed in a lower portion of the cushion retention member 28. The insertion hole 28b communicates with the insertion hole 26b formed in the base member 26. The cable 18 extending from the sensor mat 16 is inserted to the insertion holes 28b and 26b, and is connected to the ECU 15.

A description will be given of an electric structure of the ECU 15.

As shown in FIG. 4, the head rest device 10 is provided with the ECU 15, the actuator 14 connected to the ECU 15, the sensor electrode 16a, a power supply unit 31, and a collision determining section 32.

Further, the ECU 15 is provided with a CPU 33, a power supply circuit 34 connected to the CPU 33, a vehicle information input circuit 35, an actuator drive circuit 36, and a capacitance detecting circuit 37. The CPU 33 is connected to the power supply unit 31 via an ignition switch (IGSW), and a power supply is fed from the power supply unit 31 via the power supply circuit 34 on the basis of an ON operation of the ignition switch.

The CPU 33 is connected to the collision determining section 32 via the vehicle information input circuit 35, and inputs vehicle information relating to a following vehicle from the collision determining section 32. The collision determining section 32 is connected to a radar (not shown) installed in a bumper in a rear portion of the vehicle, inputs a signal from the radar, and comprehensively determines on the basis of its own speed, a speed difference from the following vehicle, an inter-vehicular distance or the like so as to determine whether or not the following vehicle has collided with the vehicle, or whether or not the following vehicle is likely to collide with the vehicle. Further, a result of determination is input to the vehicle information input circuit 35.

The CPU 33 is connected to the actuator 14 via the actuator drive circuit 36 serving as the control circuit, and controls the actuator drive circuit 36 so as to drive the actuator 14. The CPU 33 is connected to the sensor electrode 16a via the capacitance detecting circuit 37, inputs the detection signal from the sensor electrode 16a, and determines whether or not the head of the occupant comes close to the head rest device 10.

An electric connection between the ECU 15, and the power supply unit 31 or the control apparatus of the vehicle main body is established by a wiring passing through the head rest stay 4 shown in FIG. 1(*a*). The wiring extends to the lower surface of the seat 2 from the seat back 3 together with the other seat wirings, and is connected to the vehicle wiring in the lower surface of the seat 2.

If the CPU 33 determines on the basis of the detection signal input from the vehicle information input circuit 35 that the rear side of the vehicle has collided or has is likely to collide, the CPU 33 controls the actuator 14 in such a manner as to return to the original fully-closed position 12A after moving the head rest front portion 12 from the fully-closed position 12A (refer to FIG. 1(*a*)) to the fully-open position 12B (refer to FIG. 1(*b*)).

In the case that the CPU 33 determined on the basis of the detection signal input from the capacitance detecting circuit 37 that the head rest front portion 12 comes close to the head of the occupant, the CPU 33 stops the movement of the head rest front portion 12, at a time of driving the actuator 14 so as to move the head rest front portion 12 from the fully-closed position 12A toward the fully-open position 12B. Further, the CPU 33 moves the head rest front portion 12 to the fully-open position 12B, in the case that the approach of the head of the occupant is not detected.

In accordance with the present embodiment, the following advantages are obtained.

(1) The actuator 14 is mounted to the head rest rear portion 11, and the sensor electrode 16a and the ECU 15 are mounted to the head rest front portion 12. Accordingly, it is possible to shorten the harness 17 between the actuator 14 and the ECU 15, and the cable 18 between the sensor electrode 16a and the ECU 15, for example, in comparison with the case that the ECU 15 is arranged outside the head rest device 10. Accordingly, it is possible to suppress a voltage drop between the actuator 14 and the ECU 15 and between the sensor electrode 16a and the ECU 15, and it is possible to suppress a parasitic capacity generated by a long parallel provision of the harness 17 and the cable 18.

Further, since it is possible to shorten the cable 18 between the sensor electrode 16a and the ECU 15, and no connection member is necessary between the sensor electrode 16a and the cable 18, it is possible to suppress a parasitic capacity generated in the cable 18 itself, and a parasitic capacity generated between the cable 18 and a peripheral conductive material. Accordingly, it is possible to stably detect the capacitance changed by the approach of a head without complicating the wiring structure, and it is possible to improve the reliability of head detection.

(2) Since the sensor electrode 16a and the ECU 15 (the capacitance detecting circuit 37) are mounted to the head rest front portion 12, the cable 18 between the sensor electrode 16a and the ECU 15 is not deformed even if the head rest front portion 12 is moved. For example, if the structure is made such that the cable 18 is moved in accordance with the movement of the head rest front portion 12, the parasitic capacity generated between the cable 18 and the peripheral conductive material is fluctuated on the basis of the movement of the cable 18. If the external capacity described above becomes large with respect to the detected capacity, the sensitivity of head detection may deteriorate or an erroneous detection is generated. In this respect, in accordance with the structure of the embodiment described above, it is possible to suppress a fluctuation of the capacitance caused by an oscillation of the cable 18 itself, and a fluctuation of the distance between the cable 18 and the peripheral conductive material, and it is possible to stably detect the capacitance changed by the approach of the head. Further, since the sensor electrode 16a and the ECU 15 are arranged at the close positions, it is possible to minimize the parasitic capacity generated in the cable 18 itself, it is possible to suppress variations of the parts, and a favorable detecting sensitivity is ensured.

(3) Since the actuator drive circuit 36 and the capacitance detecting circuit 37 are integrally structured, it is possible to achieve a compact structure of a whole of the apparatus.

The present embodiment is not limited to the structure described above, but may be modified as follows.

In the embodiment described above, in order to fix the ECU 15 to the head rest front portion 12, the joint pins 22b of the front side support member 22 are passed through the through holes 27a of the fixing bracket 27 to which the ECU 15 is fixed, however, the ECU 15 may be fixed by a different configuration. For example, the ECU 15 may be fixed to the head rest front portion 12 by providing a socket 41 in a rear surface of the ECU 15 as shown in FIG. 5(*a*), providing an insert 42 in a front surface of the front side support member 22 as shown in FIG. 5(*b*), and fitting the insert 42 into the socket 41 of the ECU 15.

Figure 6A:
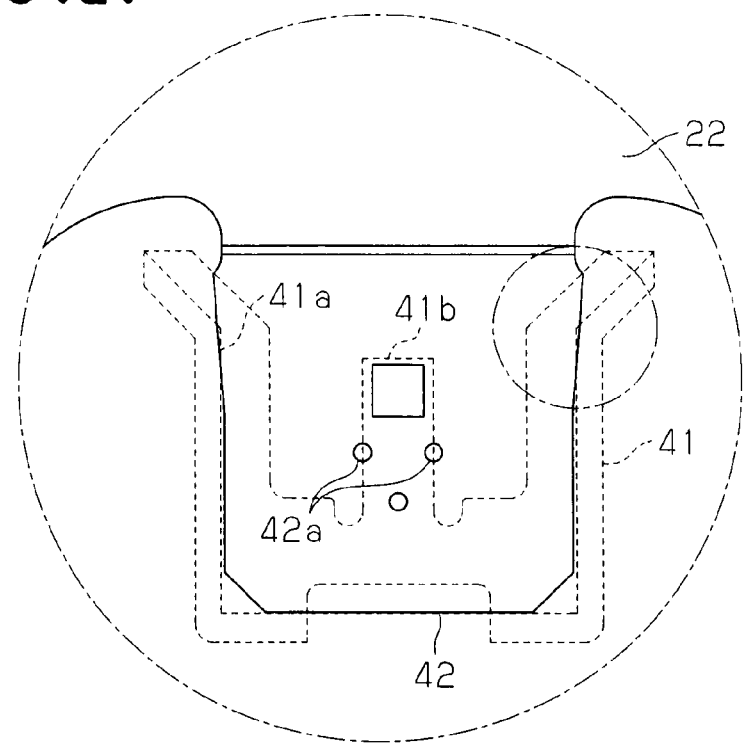
FIGS. 6(a) and 6(b) are explanatory views of a fixing structure of the ECU.

As shown in FIG. 5(a), the socket 41 has a substantially U-shaped accommodation portion 41a which is open to an upper side. The accommodation portion 41a has substantially the same size as the insert 42, and the insert 42 is accommodated in the accommodation portion 41a. Further, as shown in FIG. 6(a), an engaging portion 42a is provided in the insert 42, an engageable portion 41b is provided in the socket 41, and the engageable portion 41b is engaged with the engaging portion 42a in a state in which the insert 42 is fitted into the accommodation portion 41a, whereby the insert 42 is fixed to the socket 41. If the fixing structure of the ECU 15 is constructed in this manner, the ECU 15 is fixed only by fitting the insert 42 of the front side support member 22 into the socket 41 of the ECU 15. Accordingly, the ECU 15 is easily attached.

Figure 6B:
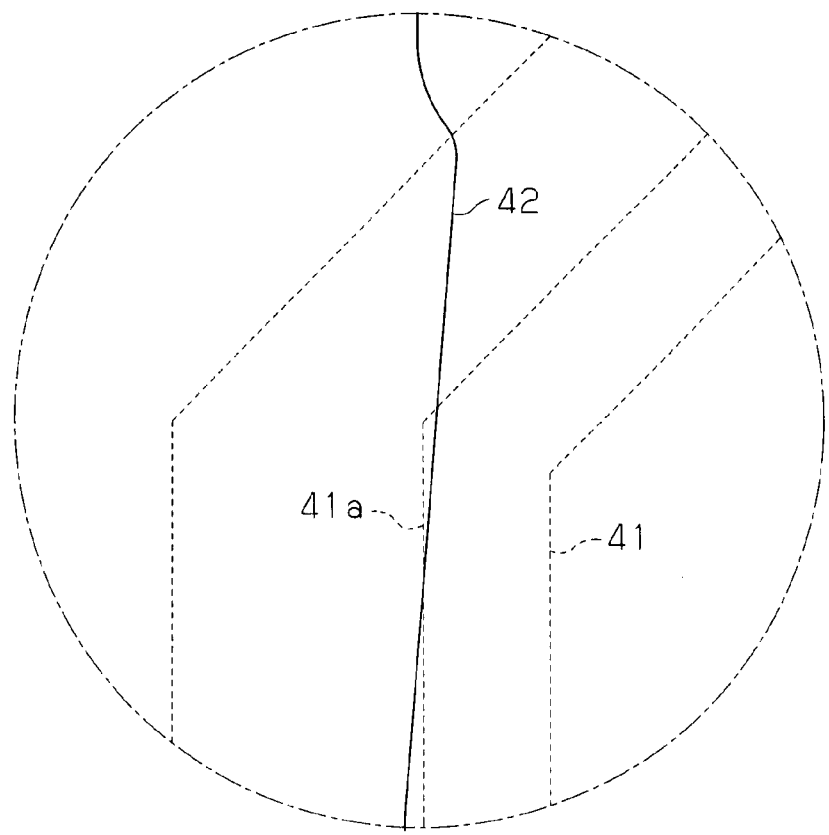

Further, if the accommodation portion 41a of the socket 41 is formed so as to be relatively narrow with respect to the insert 42 toward the upper opening, as shown in FIG. 6(b), the insert 42 is firmly fixed near the opening portion of the accommodation portion 41a in a state in which the insert 42 is accommodated in the accommodation portion 41a. Accordingly, rattling is prevented.

In the illustrated embodiment, the description is given of the case that the actuator 14 serving as the driving device is mounted to the head rest rear portion 11, however, the actuator 14 may be mounted to the head rest front portion 12. In this case, the rotary arm 23 may be structured such as to rotate on the basis of the end portion of the front side support member 22. In accordance with this structure, it is possible to minimize the length of the harness 17 connecting the actuator 14 and the ECU 15 by arranging the actuator 14 and the ECU 15 at the close positions, and it is possible to suppress the parasitic capacity generated in the cable 18. Further, since the harness 17 is not deformed in accordance with the movement of the head rest front portion 12, it is possible to suppress the parasitic capacity generated in the cable 18.

In the illustrated embodiment, the ECU 15 is structured such as to have the function of a control circuit and the function of a capacitance detecting circuit. However, the structure may be made such that these functions are achieved by independent members. In this case, for example, a capacitance detecting circuit may be mounted to the head rest front portion 12, and a control circuit may be mounted to the head rest rear portion 11.

In the illustrated embodiment, the description is given of the case that the head rest front portion 12 is moved by the actuator 14, however, the actuating system of the head rest front portion 12 may be constructed differently, as long as the head rest front portion 12 can be moved forward and backward between the fully-closed position 12A and the fully-open position 12B. For example, a spring type structure or a solenoid type structure may be employed.

In the illustrated embodiment, the description is given of the case that the vehicle seat 1 provided with the head rest device 10 is applied to the front passenger seat of the vehicle. However, the vehicle seat may be applied to other seats of a vehicle, such as a driver's seat, a rear seat, or the like.

The invention claimed is:

1. A head rest device comprising:
   a head rest rear portion configured to be supported to a seat back;
   a head rest front portion freely moving forward and backward between a fully-closed position coming close to the head rest rear portion and a fully-open position separated from the head rest rear portion;
   a driving device moving the head rest front portion;
   a control circuit controlling the driving device so as to move the head rest front portion;
   a sensor electrode structured such that a capacitance is changed in accordance as a head of an occupant approaches the sensor electrode; and
   a capacitance detecting circuit detecting the approach of the head of the occupant on the basis of a change in the capacitance of the sensor electrode,
   wherein the sensor electrode is mounted to the head rest front portion,
   wherein the driving device, the control circuit, and the capacitance detecting circuit are mounted together to one of the head rest front portion and the head rest rear portion such that when the head rest front portion is moved between the fully-closed position and the fully-opened position, a distance changes between the driving device, control circuit, and capacitance detecting circuit mounted on one of the head rest portions and the other head rest portion.

2. The head rest device according to claim 1, wherein the capacitance detecting circuit is mounted to the head rest front portion.

3. The head rest device according to claim 2, the control circuit is mounted to the head rest front portion.

4. The head rest device according to claim 2, wherein the sensor electrode is provided on a sensor mat, and a cable extends from a lower portion of the sensor mat.

5. The head rest device according to claim 4, wherein the sensor mat is arranged between a cushion retention member having a recess for accommodating a cushion, and the cushion accommodated in the recess, wherein the capacitance detecting circuit is located on a side of the cushion retention member that is opposite to the side on which the cushion is provided.

6. The head rest device according to claim 5, wherein each of the cushion retention member and a base member supporting the cushion retention member has an insertion hole, and the cable is connected to the control circuit via the insertion hole.

7. The head rest device according to claim 2, wherein an extensible mechanism moving the head rest front portion is provided between the head rest front portion and the head rest rear portion, and the driving device is provided in the extensible mechanism.

8. The head rest device according to claim 7, wherein the capacitance detecting circuit is fixed to a front portion of the extensible mechanism.

* * * * *